(12) United States Patent
Shi et al.

(10) Patent No.: US 12,731,821 B2
(45) Date of Patent: Sep. 8, 2026

(54) ELECTROCHEMICAL APPARATUS WITH MULTI-STAGE DISCHARGE CUT-OFF VOLTAGE CONTROL, AND CONTROL METHOD THEREOF, ELECTRONIC DEVICE, AND STORAGE MEDIUM

(71) Applicant: Ningde Amperex Technology Limited, Ningde (CN)

(72) Inventors: Benyang Shi, Ningde (CN); Bangkun Zou, Ningde (CN); Lele Lin, Ningde (CN)

(73) Assignee: Ningde Amperex Technology Limited, Ningde City (CN)

( * ) Notice: Subject to any disclaimer, the term of this patent is extended or adjusted under 35 U.S.C. 154(b) by 746 days.

(21) Appl. No.: 18/193,751

(22) Filed: Mar. 31, 2023

(65) Prior Publication Data

US 2023/0318054 A1 Oct. 5, 2023

Related U.S. Application Data

(63) Continuation of application No. PCT/CN2022/142354, filed on Dec. 27, 2022.

(30) Foreign Application Priority Data

Mar. 31, 2022 (CN) ......................... 202210331872.0

(51) Int. Cl.
*H01M 10/44* (2006.01)
*H01M 4/38* (2006.01)
(Continued)

(52) U.S. Cl.
CPC ........... *H01M 10/44* (2013.01); *H01M 4/386* (2013.01); *H01M 4/587* (2013.01); *H02J 7/865* (2026.01);
(Continued)

(58) Field of Classification Search
CPC ..................................................... H01M 10/44
(Continued)

(56) References Cited

U.S. PATENT DOCUMENTS

2017/0093179 A1* 3/2017 Cho ...................... H01M 4/386
2021/0143661 A1* 5/2021 Xu ...................... H02J 7/00714
2021/0328275 A1* 10/2021 Cai ...................... H01M 10/44

FOREIGN PATENT DOCUMENTS

CN 102244240 A 11/2011
CN 102403491 A 4/2012
(Continued)

OTHER PUBLICATIONS

Supplementary Search Report issued on May 7, 2025, in corresponding European Application No. 22871130.5, 2 pages.
(Continued)

*Primary Examiner* — Yalkew Fantu
(74) *Attorney, Agent, or Firm* — Maier & Maier, PLLC

(57) ABSTRACT

An electrochemical apparatus including a negative electrode active substance. The negative electrode active substance includes a first active substance and a second active substance, a discharge capacity per unit mass of the first active substance is smaller than that of the second active substance, and a life cycle of the electrochemical apparatus includes N cycle segments arranged sequentially, where N is a positive integer greater than or equal to 2, each cycle segment includes at least one charge-discharge cycle of the electrochemical apparatus, and the electrochemical apparatus is charged and discharged cyclically based on the $i^{th}$ discharge cut-off voltage in the $i^{th}$ cycle segment, where $1 \leq i \leq N$ and the $i^{th}$ discharge cut-off voltage between the $1^{st}$ discharge cut-off voltage and the $(N-1)^{th}$ discharge cut-off voltage is smaller than the $(i+1)^{th}$ discharge cut-off voltage.

17 Claims, 2 Drawing Sheets

(51) Int. Cl.
*H01M 4/587* (2010.01)
*H02J 7/00* (2006.01)
*H02J 7/96* (2026.01)
*H01M 4/02* (2006.01)

(52) U.S. Cl.
CPC ......... *H02J 7/96* (2026.01); *H01M 2004/027* (2013.01)

(58) Field of Classification Search
USPC .......................................................... 320/134
See application file for complete search history.

(56) References Cited

FOREIGN PATENT DOCUMENTS

| | | | |
|---|---|---|---|
| CN | 104810565 | A | 7/2015 |
| CN | 109845015 | A | 6/2019 |
| CN | 111954965 | A | 11/2020 |
| CN | 113646652 | A | 11/2021 |
| EP | 2573858 | A1 | 3/2013 |
| EP | 3297070 | A1 | 3/2018 |
| JP | 2018041529 | A | 3/2018 |
| WO | 2016120917 | A1 | 8/2016 |

OTHER PUBLICATIONS

International Search Report issued on Mar. 22, 2023, in corresponding International Application No. PCT/CN2022/142354, 8 pages.
Office Action issued on Mar. 18, 2026, in corresponding Chinese Application No. 202210331872.0, 30 pages.

* cited by examiner

ELECTROCHEMICAL APPARATUS WITH MULTI-STAGE DISCHARGE CUT-OFF VOLTAGE CONTROL, AND CONTROL METHOD THEREOF, ELECTRONIC DEVICE, AND STORAGE MEDIUM

CROSS REFERENCES TO RELATED APPLICATIONS

This application is a continuation application of International Application No. PCT/CN2022/142354, filed on Dec. 27, 2022, which claims priority to Chinese Application No. 202210331872.0, filed on Mar. 31, 2022, the disclosure of which is incorporated herein by reference in its entirety.

TECHNICAL FIELD

Some embodiments of this application relate to the field of electrochemical technologies, and in particular, to an electrochemical apparatus and a control method therefor, an electronic device, and a storage medium.

BACKGROUND

With the popularization of electronic products such as laptops, mobile phones, tablets, mobile power supplies, and drones, requirements for electrochemical apparatuses therein are increasingly higher. The electrochemical apparatuses are required not only to be lightweight but also have a high mass energy density and a long service life. Secondary batteries such as lithium-ion batteries and sodium-ion batteries are electrochemical apparatuses commonly used in electronic products. Silicon material has a high reversible capacity. Therefore, silicon is considered to be a negative electrode material that may be applied to secondary batteries, so as to further improve the mass energy density of the secondary batteries. However, the mass of a silicon-based negative electrode material swells greatly during the cycling process, which affects the service life of secondary batteries.

SUMMARY

In view of this, some embodiments of this application provide an electrochemical apparatus and a control method therefor, an electronic device, and a storage medium, which can prolong the service life of an electrochemical apparatus while increasing the mass energy density of the electrochemical apparatus.

According to a first aspect of the embodiments of this application, an electrochemical apparatus is provided. A negative electrode active substance of the electrochemical apparatus includes a first active substance and a second active substance, a discharge capacity per unit mass of the first active substance is smaller than that of the second active substance, and a life cycle of the electrochemical apparatus includes N cycle segments arranged sequentially, where N is a positive integer greater than or equal to 2, each cycle segment includes at least one charge-discharge cycle of the electrochemical apparatus, and the electrochemical apparatus is charged and discharged cyclically based on the $i^{th}$ discharge cut-off voltage in the $i^{th}$ cycle segment, where $1 \leq i \leq N$ and the $i^{th}$ discharge cut-off voltage between the $1^{st}$ discharge cut-off voltage and the $(N-1)^{th}$ discharge cut-off voltage is smaller than the $(i+1)^{th}$ discharge cut-off voltage.

In some embodiments, the first active substance includes graphite, and the second active substance includes silicon.

In some embodiments, the life cycle of the electrochemical apparatus includes the $1^{st}$ cycle segment and the $2^{nd}$ cycle segment that are arranged sequentially, and one of the following conditions is satisfied: A mass percentage of silicon in the negative electrode active substance is (0%, 20%], and a value range for the number of cycles corresponding to a boundary between the $1^{st}$ cycle segment and the $2^{nd}$ cycle segment is [300, 500]; a mass percentage of silicon in the negative electrode active substance is (20%, 60%], a value range for the number of cycles corresponding to a boundary between the $1^{st}$ cycle segment and the $2^{nd}$ cycle segment is [100, 300); or a mass percentage of silicon in the negative electrode active substance is (60%, 100%), and a value range for the number of cycles corresponding to a boundary between the $1^{st}$ cycle segment and the $2^{nd}$ cycle segment is [1, 100).

In some embodiments, the life cycle of the electrochemical apparatus includes the $1^{st}$ cycle segment, the $2^{nd}$ cycle segment, and the $3^{rd}$ cycle segment that are arranged sequentially, and one of the following conditions is satisfied: A mass percentage of silicon in the negative electrode active substance is (0%, 20%], a value range for the number of cycles corresponding to a boundary between the $1^{st}$ cycle segment and the $2^{nd}$ cycle segment is [300, 5001, and a value range for the number of cycles corresponding to a boundary between the $2^{nd}$ cycle segment and the $3^{rd}$ cycle segment is [800, 1000]; a mass percentage of silicon in the negative electrode active substance is (20%, 60%], a value range for the number of cycles corresponding to a boundary between the $1^{st}$ cycle segment and the $2^{nd}$ cycle segment is [100, 300), and a value range for the number of cycles corresponding to a boundary between the $2^{nd}$ cycle segment and the $3^{rd}$ cycle segment is [600, 800); or a mass percentage of silicon in the negative electrode active substance is (60%, 100%], a value range for the number of cycles corresponding to a boundary between the $1^{st}$ cycle segment and the $2^{nd}$ cycle segment is [1, 100), and a value range for the number of cycles corresponding to a boundary between the $2^{nd}$ cycle segment and the $3^{rd}$ cycle segment is [200, 400].

In some embodiments, in the $i^{th}$ cycle segment between the $1^{st}$ cycle segment and the $(N-1)^{th}$ cycle segment, when the electrochemical apparatus is charged and discharged cyclically based on the number of cycles corresponding to a boundary between the $i^{th}$ cycle segment and the $(i+1)^{th}$ cycle segment, a difference in capacity retention rates, between cyclic charging and discharging based on the $i^{th}$ discharge cut-off voltage and cyclic charging and discharging based on the $(i+1)^{th}$ discharge cut-off voltage, of the electrochemical apparatus is less than 20%.

In some embodiments, the second active substance includes silicon, and the electrochemical apparatus includes the $1^{st}$ discharge cut-off voltage and the $2^{nd}$ discharge cut-off voltage. A value range of the $1^{st}$ discharge cut-off voltage is [2.2V, 3V), and a value range of the $2^{nd}$ discharge cut-off voltage is [3V, 3.3V).

In some embodiments, the second active substance includes silicon, and the electrochemical apparatus includes the $1^{st}$ discharge cut-off voltage, the $2^{nd}$ discharge cut-off voltage, and the $3^{nd}$ discharge cut-off voltage. A value range of the $1^{st}$ discharge cut-off voltage is [2.2V, 3V), a value range of the $2^{nd}$ discharge cut-off voltage is [3V, 3.3V), and a value range of the $3^{rd}$ discharge cut-off voltage is [3.3V, 3.8V).

According to a second aspect of the embodiments of this application, an electrochemical apparatus control method is provided to control a charging and discharging process of an electrochemical apparatus. A negative electrode active substance of the electrochemical apparatus includes a first active substance and a second active substance, a discharge capacity per unit mass of the first active substance is smaller than that of the second active substance, and a life cycle of the electrochemical apparatus includes N cycle segments arranged sequentially, where N is a positive integer greater than or equal to 2, and each cycle segment includes at least one charge-discharge cycle of the electrochemical apparatus. The electrochemical apparatus control method includes: controlling the electrochemical apparatus to be charged and discharged cyclically based on the $i^{th}$ discharge cut-off voltage in the $i^{th}$ cycle segment, where the $i^{th}$ discharge cut-off voltage between the $1^{st}$ discharge cut-off voltage and the $(N-1)^{th}$ discharge cut-off voltage is smaller than the $(i+1)^{th}$ discharge cut-off voltage.

According to a third aspect of the embodiments of this application, a computer-readable storage medium is provided. The computer-readable storage medium stores a computer program, and when the computer program is executed by a processor, the electrochemical apparatus control method according to any one of the foregoing embodiments is implemented.

According to a fourth aspect of the embodiments of this application, an electronic device is provided. The electronic device includes a processor and a machine-readable storage medium. The machine-readable storage medium stores machine-executable instructions that can be executed by the processor. When the processor executes the machine-executable instructions, the electrochemical apparatus control method according to any one of the foregoing embodiments is implemented.

It can be learned from the foregoing technical solution that a discharge capacity per unit mass of the second active substance is larger than that of the first active substance, but a swelling rate of the second active substance is higher than that of the first active substance during the cycling process of the electrochemical apparatus. The life cycle of the electrochemical apparatus is divided into multiple cycle segments, discharging is performed until a specified discharge cut-off voltage within each cycle segment, and the discharge cut-off voltage is increased gradually according to a time order of the cycle segments. The increase of the discharge cut-off voltage can reduce participation amount of the second active substance during the discharging process. At an early stage of cycling, a low discharge cut-off voltage is used to fully utilize the advantage of the second active substance in discharge capacity per unit mass, so as to increase the mass energy density of the electrochemical apparatus. The discharge cut-off voltage is gradually increased with cycling degradation, so as to reduce the participation amount of the second active substance during the discharging process. This reduces mass swelling of the electrochemical apparatus resulting from swelling of the second active substance, improves cycling performance of the electrochemical apparatus, and prolongs its service life. As a result, the mass energy density of the electrochemical apparatus is increased while the service life of the electrochemical apparatus is prolonged.

BRIEF DESCRIPTION OF THE DRAWINGS

To describe the technical solutions in some embodiments of this application or in the prior art more clearly, the following briefly describes the accompanying drawings required for describing the embodiments or the prior art. Apparently, the accompanying drawings in the following description show merely some of the embodiments of this application, and persons of ordinary skill in the art may still derive other drawings from these accompanying drawings.

DETAILED DESCRIPTION

Figure 1:
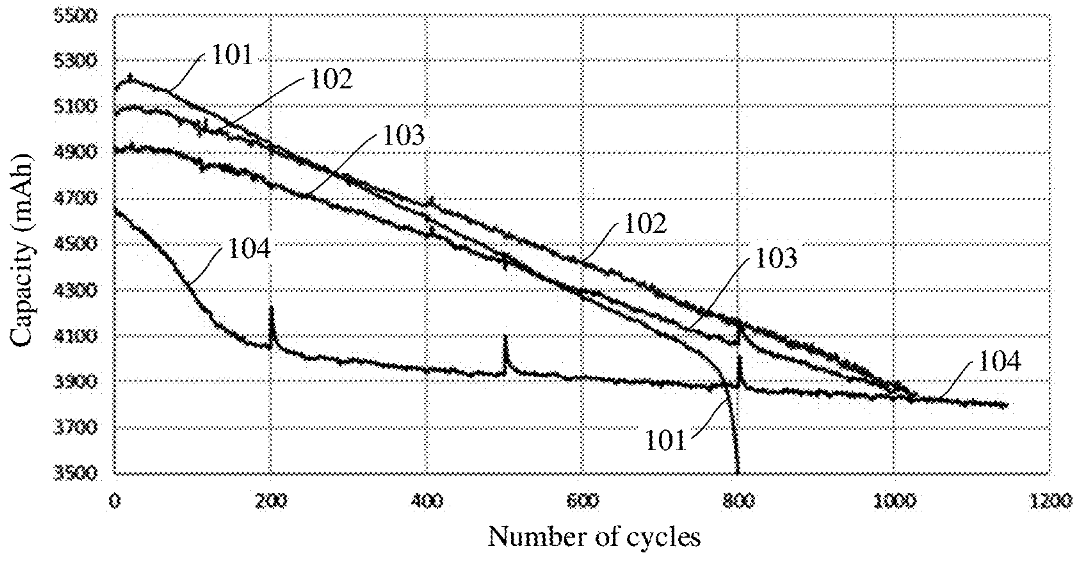
FIG. 1 shows curves of capacity varying with the number of cycles of an electrochemical apparatus according to an embodiment of this application.

To help those skilled in the art better understand the technical solutions in some embodiments of this application, the following clearly and completely describes the technical solutions in the embodiments of this application with reference to the accompanying drawings in the embodiments of this application. Apparently, the described embodiments are some but not all of the embodiments of this application. All other embodiments obtained by persons of ordinary skill in the art based on the embodiments of this application shall fall within the protection scope of this application.

In the following description, an electrochemical apparatus and a control method therefor, an electronic device, and a storage medium in the embodiments of this application are first described in detail. Then, some relevant examples and comparative examples are present regarding the electrochemical apparatus and the control method therefor in the embodiments of this application, so as to expound remarkable superiority of the electrochemical apparatus and the control method therefor, the electronic device, and the storage medium in the embodiments of this application compared with the prior art.

The following describes specific implementation of the embodiments of this application with reference to the accompanying drawings.

It should be noted that in the descriptions of the embodiments of this application, a lithium-ion battery is used as an example of the electrochemical apparatus for explanation of this application. However, the electrochemical apparatus of this application is not limited to the lithium-ion battery.

Electrochemical Apparatus

An electrochemical apparatus provides electric energy for electronic products such as laptops, mobile phones, tablets, mobile power supplies, and drones. The electrochemical apparatus in the embodiments of this application includes a secondary battery. Lithium-ion batteries, sodium-ion batteries, and the like all use a graphite-based negative electrode. As requirements for the weight, mass, and battery life of electronic devices constantly increase, the mass energy density of an electrochemical apparatus needs to be increased. Materials with a large gram capacity such as silicon and phosphorus have a large reversible capacity. Therefore, silicon, phosphorus, and other materials of this type are used as a negative electrode material of an electrochemical apparatus to further increase the mass energy density of the electrochemical apparatus. However, the negative electrode material with a large gram capacity may swell greatly during the cycling process, which affects the service life of the electrochemical apparatus. Therefore, a technical solution is required to improve the mass energy density of the electrochemical apparatus while granting a long service life for the electrochemical apparatus.

An embodiment of this application provides an electrochemical apparatus. A negative electrode active material of the electrochemical apparatus includes a first active material and a second active material, and a discharge capacity per unit mass of a first active substance is smaller than that of a second active substance. A life cycle of the electrochemical apparatus includes N cycle segments that are arranged sequentially, where N is a positive integer greater than or equal to 2. Each cycle segment includes at least one charge-discharge cycle of the electrochemical apparatus, and the electrochemical apparatus is charged and discharged cyclically based on the $i^{th}$ discharge cut-off voltage in the $i^{th}$ cycle segment, where $1 \leq i \leq N$. The $i^{th}$ discharge cut-off voltage between the $1^{st}$ discharge cut-off voltage and the $(N-1)^{th}$ discharge cut-off voltage is smaller than the $(i+1)^{th}$ discharge cut-off voltage.

The discharge capacity per unit mass is the gram capacity, which refers to a ratio of electric capacity that can be released by an active material inside a battery to the mass of the active material. The gram capacity is measured in milliampere hour per gram (mA·h/g). The discharge capacity per unit mass of the first active material is smaller than that of the second active material. When the first active material and the second active material of the same mass are separately used as the negative electrode active material of a battery, the power that can be released by the first active material is less than the power that can be released by the second active material.

The life cycle of the electrochemical apparatus includes N cycle segments. Each cycle segment includes one or more charge-discharge cycles. The electrochemical apparatus is charged and discharged cyclically based on the $i^{th}$ discharge cut-off voltage in the $i^{th}$ cycle segment, that is, in each charge-discharge cycle included in the $i^{th}$ cycle segment, the electrochemical apparatus discharges until the $i^{th}$ discharge cut-off voltage. The $i^{th}$ discharge cut-off voltage between the $1^{st}$ discharge cut-off voltage and the $(N-1)^{th}$ discharge cut-off voltage is smaller than the $(i+1)^{th}$ discharge cut-off voltage. That is, the discharge cut-off voltage is increased gradually according to a time order of the cycle segments, and the discharge cut-off voltage corresponding to a next cycle segment is larger than the discharge cut-off voltage corresponding to a previous cycle segment.

In this embodiment of this application, the discharge capacity per unit mass of the second active substance is larger than that of the first active substance, but a swelling rate of the second active substance is higher than that of the first active substance during the cycling process of the electrochemical apparatus. The life cycle of the electrochemical apparatus is divided into multiple cycle segments, discharging is performed based on a specified discharge cut-off voltage within each cycle segment, and the discharge cut-off voltage is increased gradually according to a time order of the cycle segments. The increase of the discharge cut-off voltage can reduce participation amount of the second active substance during the discharging process. At an early stage of cycling, a low discharge cut-off voltage is used to fully utilize the advantage of the second active substance in discharge capacity per unit mass, so as to increase the mass energy density of the electrochemical apparatus. The discharge cut-off voltage is gradually increased with degradation of cycling, so as to reduce the participation amount of the second active material during the discharging process. This reduces mass swelling of the electrochemical apparatus resulting from swelling of the second active substance, improves cycling performance of the electrochemical apparatus, and prolongs its service life. As a result, the mass energy density of the electrochemical apparatus is increased while the service life of the electrochemical apparatus is prolonged.

In a possible implementation, the first active substance includes graphite, and the second active substance includes silicon.

In this embodiment of this application, silicon has a higher discharge capacity per unit mass than graphite, so the mass energy density of the electrochemical apparatus can be increased when a silicon-containing material is used as the second active substance. However, silicon will cause great mass swelling during the cycling process as well as rapid increase of internal resistance of the electrochemical apparatus. For the electrochemical apparatus in which the negative electrode active substance includes graphite and silicon, the life cycle of the electrochemical apparatus is divided into multiple cycle segments, so that each cycle segment includes multiple charge-discharge cycles. Discharging is performed until a specified discharge cut-off voltage within each cycle segment, and the discharge cut-off voltage is increased gradually according to a time order of the cycle segments. The discharge cut-off voltage is gradually increased with degradation of cycling, so as to reduce participation amount of silicon during the discharging process. In this way, mass swelling of silicon is reduced, and then the service life of the electrochemical apparatus is prolonged. Therefore, by adding silicon to the negative electrode active substance, the mass energy density of the electrochemical apparatus can be increased, so that the discharge cut-off voltage is gradually increased. This can reduce mass swelling of the electrochemical apparatus at a late stage of cycling. In this way, the energy density of the electrochemical apparatus is increased throughout the entire life cycle, and the service life of the electrochemical apparatus is prolonged.

The first active substance may be graphite, mesocarbon microbeads (Mesocarbon microbeads, MCMB), $Li_4Ti_5O_{12}$, or the like. The second active substance includes silicon. For example, the second active substance may be $SiO_x$ ($0<x<2$), micron silicon, silicon nanowires, SiC, or the like. The foregoing second active substances can be freely combined. The negative electrode active substance of the electrochemical apparatus may include one or more of the foregoing second active substances. The second active substance may alternatively be a transition metal oxide (such as MnO, $SnO_2$, CoO), phosphorus, or the like. The first active substance and the second active substance can be freely combined. The negative electrode active substance of the electrochemical apparatus may include multiple first active substances and/or multiple second active substances.

In a possible implementation, the life cycle of the electrochemical apparatus includes the Pt cycle segment and the $2^{nd}$ cycle segment that are arranged sequentially. When a mass percentage of silicon in the negative electrode active substance is (0%, 20%], a value range for the number of cycles corresponding to a boundary between the $1^{st}$ cycle segment and the $2^{nd}$ cycle segment is [300, 500]. When a mass percentage of silicon in the negative electrode active substance is (20%, 60%], a value range for the number of cycles corresponding to the boundary between the $1^{st}$ cycle segment and the $2^{nd}$ cycle segment is [100, 300). When a mass percentage of silicon in the negative electrode active substance is (60%, 100%), and a value range for the number of cycles corresponding to a boundary between the Pt cycle segment and the $2^{nd}$ cycle segment is [1, 100).

When the mass percentage of silicon in the negative electrode active substance is (0%, 20%], an amplitude of swelling resulting from early cycling based on a low discharge cut-off voltage is inconspicuous, a cycling slope is low, and the value range for the number of cycles corresponding to the boundary between the Pt cycle segment and the $2^{nd}$ cycle segment is set to [300, 500]. When the mass percentage of silicon in the negative electrode active substance is (20%, 60%], the swelling resulting from early cycling based on a low discharge cut-off voltage is greater than that when the mass percentage of silicon is (0%, 20%], the cycling slope is higher than that when the mass percentage of silicon is (0%, 20%], and the value range for the number of cycles corresponding to the boundary between the Pt cycle segment and the $2^{nd}$ cycle segment is set to [100, 300). When the mass percentage of silicon in the negative electrode active substance is (60%, 100%), the swelling resulting from early cycling to a low discharge cut-off voltage is greater than that when the mass percentage of silicon is (20%, 60%], the cycling slope is higher than that when the mass percentage of silicon is (20%, 60%], and the value range for the number of cycles corresponding to the boundary between the $1^{st}$ cycle segment and the $2^{nd}$ cycle segment is set to [1, 100).

In the embodiment of this application, the life cycle of the electrochemical apparatus includes the $1^{st}$ cycle segment and the $2^{nd}$ cycle segment. When the mass percentage of silicon in the negative electrode active substance is higher, the amplitude of swelling resulting from early cycling based on a low discharge cut-off voltage is greater. Therefore, the number of cycles corresponding to the boundary between the $1^{st}$ cycle segment and the $2^{nd}$ cycle segment decreases when the mass percentage of silicon in the negative electrode active substance increases. This ensures that the electrochemical apparatus has no excessive swelling during early cycling based on a low discharge cut-off voltage, thereby ensuring that the electrochemical apparatus can continue to operate for a long time after the discharge cut-off voltage is increased. As a result, the service life of the electrochemical apparatus is prolonged.

In a possible implementation, the life cycle of the electrochemical apparatus includes the $1^{st}$ cycle segment, the $2^{nd}$ cycle segment, and the $3^{rd}$ cycle segment that are arranged sequentially. When a mass percentage of silicon in the negative electrode active substance is (0%, 20%], a value range for the number of cycles corresponding to a boundary between the Pt cycle segment and the $2^{nd}$ cycle segment is [300, 500], and a value range for the number of cycles corresponding to a boundary between the $2^{nd}$ cycle segment and the $3^{rd}$ cycle segment is [800, 1000]. When a mass percentage of silicon in the negative electrode active substance is (20%, 60%], a value range for the number of cycles corresponding to a boundary between the $1^{st}$ cycle segment and the $2^{nd}$ cycle segment is [100, 300), and a value range for the number of cycles corresponding to a boundary between the $2^{nd}$ cycle segment and the $3^{rd}$ cycle segment is [600, 800). When a mass percentage of silicon in the negative electrode active substance is (60%, 100%], a value range for the number of cycles corresponding to a boundary between the Pt cycle segment and the $2^{nd}$ cycle segment is [1, 100), and a value range for the number of cycles corresponding to a boundary between the $2^{nd}$ cycle segment and the $3^{rd}$ cycle segment is [200, 400].

In this embodiment of this application, the life cycle of the electrochemical apparatus includes the $1^{st}$ cycle segment, the $2^{nd}$ cycle segment, and the $3^{rd}$ cycle segment. A higher mass percentage of silicon in the negative electrode active substance leads to greater swelling of the electrochemical apparatus resulting from early cycling based on a low discharge cut-off voltage. Therefore, when the mass percentage of silicon in the negative electrode active substance is high, the boundary between the Pt cycle segment and the $2^{nd}$ cycle segment corresponds to a smaller number of cycles. In this case, mass swelling of the electrochemical apparatus during early cycling based on a low discharge cut-off voltage is reduced. In addition, the life cycle of the electrochemical apparatus is divided into three cycle segments, and the discharge cut-off voltage of the electrochemical apparatus is increased twice, so as to make silicon discharge slightly and reduce mass swelling. In this way, the energy density of the electrochemical apparatus is increased throughout the entire life cycle while the service life of the electrochemical apparatus is ensured.

In a possible implementation, the life cycle of the electrochemical apparatus includes N cycle segments arranged sequentially, where the N cycle segments are divided by N−1 boundaries. For the $i^{th}$ cycle segment between the $1^{st}$ cycle segment and the $(N-1)^{th}$ cycle segment, the $i^{th}$ boundary is used to delimit the $i^{th}$ cycle segment from the $(i+1)^{th}$ cycle segment. The electrochemical apparatus is charged and discharged cyclically based on the $i^{th}$ discharge cut-off voltage in the $i^{th}$ cycle segment, and is charged and discharged cyclically based on the $(i+1)^{th}$ discharge cut-off voltage in the $(i+1)^{th}$ cycle segment. When the electrochemical apparatus is charged and discharged cyclically based on the $i^{th}$ discharge cut-off voltage at the $i^{th}$ boundary, the capacity retention rate is the $i^{th}$ capacity retention rate, and when the electrochemical apparatus is charged and discharged cyclically based on the $(i+1)^{th}$ discharge cut-off voltage at the $i^{th}$ boundary, the capacity retention rate is the $(i+1)^{th}$ capacity retention rate. A difference between the $i^{th}$ capacity retention rate and the $(i+1)^{th}$ capacity retention rate is less than 20%.

For example, the $i^{th}$ boundary corresponds to 400 cycles. After the electrochemical apparatus completes the 400th cycle of charging and discharging based on the $i^{th}$ discharge cut-off voltage, the electrochemical apparatus starts the $401^{st}$ cycle of charging and discharging based on the $(i+1)^{th}$ discharge cut-off voltage. When the electrochemical apparatus discharges at the $i^{th}$ discharge cut-off voltage in the 400th charge-discharge cycle, the capacity retention rate is $C_i$, and when the electrochemical apparatus discharges at the $(i+1)^{th}$ discharge cut-off voltage in the 400th charge-discharge cycle, the capacity retention rate is $C_{i+1}$. In this case, $|C_i-C_{i+1}|<20\%$, for example, $C_i-C_{i+1}=0$.

When the amount of the second active substance in the negative electrode active substance is constant, the cycling slope of the electrochemical apparatus varies with the discharge cut-off voltage. FIG. 1 shows curves of capacity varying with the number of cycles of an electrochemical apparatus according to an embodiment of this application. A curve 101 corresponds to a discharge cut-off voltage of 3.0V, a curve 102 corresponds to a discharge cut-off voltage of 3.2V, a curve 103 corresponds to a discharge cut-off voltage of 3.3V, and a curve 104 corresponds to a discharge cut-off voltage of 3.4V. It can be seen from FIG. 1 that when the discharge cut-off voltage is higher, cycling stability of the electrochemical apparatus is better, but initial capacity may decrease accordingly. The cycling curves corresponding to different discharge cut-off voltages have intersections at which a specified number of cycles is reached.

Figure 2:
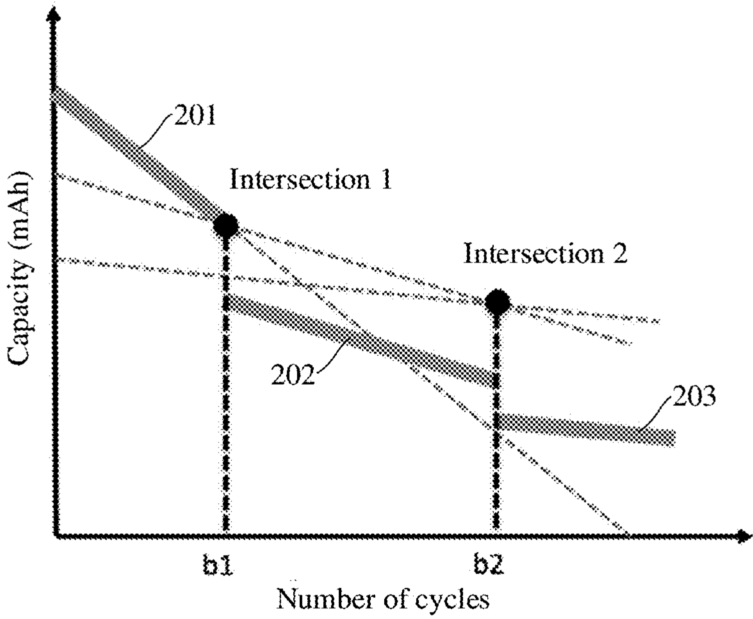
FIG. 2 shows curves of cycling based on different discharge cut-off voltages of an electrochemical apparatus according to an embodiment of this application.

FIG. 2 shows curves of cycling of an electrochemical apparatus according to an embodiment of this application under different discharge cut-off voltages. A curve 201 corresponds to a discharge cut-off voltage of V1, a curve 202 corresponds to a discharge cut-off voltage of V2, a curve 203 corresponds to a discharge cut-off voltage of V3, and V1>V2>V3. When the mass percentage of the second active substance in the negative electrode active substance is constant, the electrochemical apparatus is charged and discharged cyclically based on a high discharge cut-off voltage. In this case, the capacity retention rate of the electrochemical apparatus degrades more slowly as the number of cycles increases, but the initial capacity and energy of the electrochemical apparatus are smaller. As a result, when different discharge cut-off voltages are used, the cycling curves have intersections, for example, intersection 1 and intersection 2. The intersection 1 corresponds to a number of cycles, which is referred to as b1, and the intersection 2 corresponds to a number of cycles, which is referred to as b2. If the discharge cut-off voltage is increased at the intersection 1, the cycling capacity decreases, but the cycling slope is better than that before the increase of voltage. Advantages in capacity and cycling may be reflected after a specified number of cycles. Likewise, if the discharge cut-off voltage is increased at the intersection 2, the capacity and cycle life of the electrochemical apparatus can be increased in the entire life cycle.

It should be noted that the discharge cut-off voltage is increased at b1 and b2, and the increase of the discharge cut-off voltage may reduce the capacity of the electrochemical apparatus, so the capacity retention rate of the electrochemical apparatus may be stepped at b1 and b2. As shown in FIG. 2, solid lines represent cycling curves (curves of the capacity retention rate varying with the number of cycles) of the electrochemical apparatus in corresponding cycle segments, and curves represent cycling curves of the electrochemical apparatus during cycling based on corresponding constant discharge cut-off voltages.

In this embodiment of this application, when the electrochemical apparatus is charged and discharged cyclically based on the number of cycles corresponding to a boundary between the $i^{th}$ cycle segment and the $(i+1)^{th}$ cycle segment, a difference in capacity retention rates, between cyclic charging and discharging based on the $i^{th}$ discharge cut-off voltage and cyclic charging and discharging based on the $(i+1)^{th}$ discharge cut-off voltage, of the electrochemical apparatus is less than 20%. For example, the difference in capacity retention rates, between cyclic charging and discharging based on the $i^{th}$ discharge cut-off voltage and cyclic charging and discharging based on the $(i+1)^{th}$ discharge cut-off voltage, of the electrochemical apparatus is 0. After the number of cycles is greater than the $i^{th}$ boundary, the capacity measured for cycling at the $i^{th}$ discharge cut-off voltage is smaller than that measured for cycling at the $(i+1)^{th}$ discharge cut-off voltage, and the cycling performance for cycling at the $i^{th}$ discharge cut-off voltage is worse than that for cycling at the $(i+1)^{th}$ discharge cut-off voltage. Therefore, $|C_i-C_{i+1}|<20\%$. In this case, the discharge cut-off voltage of the electrochemical apparatus can be changed in a timely manner. By using a discharge cut-off voltage that is more conducive to the capacity and the cycling performance of the electrochemical apparatus, the mass energy density and the service life of the electrochemical apparatus can be further improved.

In a possible implementation, when the negative electrode active substance includes silicon, the life cycle of the electrochemical apparatus can be divided into the $1^{st}$ cycle segment and the $2^{nd}$ cycle segment. In the $1^{st}$ cycle segment, the electrochemical apparatus is charged and discharged cyclically based on the $1^{st}$ discharge cut-off voltage, and in the $2^{nd}$ cycle segment, the electrochemical apparatus is charged and discharged cyclically based on the $2^{nd}$ discharge cut-off voltage, where the $1^{st}$ discharge cut-off voltage is smaller than the $2^{nd}$ discharge cut-off voltage. A value range of the $1^{st}$ discharge cut-off voltage is [2.2V, 3V), and a value range of the $2^{nd}$ discharge cut-off voltage is [3V, 3.3V).

In this embodiment of this application, when discharging to 100% SOC, a corresponding discharge voltage of a graphite system is 3.0V, and silicon can still provide discharge capacity even below 3.0V due to discharge characteristics of silicon, but there is a lower limit. The $1^{st}$ discharge cut-off voltage is within the value range [2.2V, 3V), for example, the $1^{st}$ discharge cut-off voltage may be 2.2V. This can fully utilize the high gram capacity advantage of silicon, increasing the mass energy density of the electrochemical apparatus. Increase of the discharge cut-off voltage may reduce the capacity of the electrochemical apparatus. To avoid an excessively reduced capacity of the electrochemical apparatus caused by an excessive increase of the discharge cut-off voltage, the $2^{nd}$ discharge cut-off voltage is within the value range [3V, 3.3V). For example, the $2^{nd}$ discharge cut-off voltage may be 3V. This can guarantee improved cycle life of the electrochemical apparatus and increased energy density of the electrochemical apparatus throughout the life cycle.

In a possible implementation, when the negative electrode active substance includes silicon, the life cycle of the electrochemical apparatus can be divided into the $1^{st}$ cycle segment, the $2^{nd}$ cycle segment, and the $3^{rd}$ cycle segment. In the $1^{st}$ cycle segment, the electrochemical apparatus is charged and discharged cyclically based on the $1^{st}$ discharge cut-off voltage, in the $2^{nd}$ cycle segment, the electrochemical apparatus is charged and discharged cyclically based on the $2^{nd}$ discharge cut-off voltage, and in the $3^{rd}$ cycle segment, the electrochemical apparatus is charged and discharged cyclically based on the $3^{rd}$ discharge cut-off voltage. The $1^{st}$ discharge cut-off voltage is smaller than the $2^{nd}$ discharge cut-off voltage, and the $2^{nd}$ discharge cut-off voltage is smaller than the $3^{rd}$ discharge cut-off voltage. A value range of the $1^{st}$ discharge cut-off voltage is [2.2V, 3V), a value range of the $2^{nd}$ discharge cut-off voltage is [3V, 3.3V), and a value range of the $3^{rd}$ discharge cut-off voltage is [3.3V, 3.8V).

In this embodiment of this application, silicon can still provide discharge capacity even below 3.0V. The value range of the $1^{st}$ discharge cut-off voltage is [2.2V, 3V), so that the electrochemical apparatus cycles based on a low discharge cut-off voltage at an early stage. This fully utilizes the high gram capacity advantage of silicon, increasing the mass energy density of the electrochemical apparatus. The value range of the $2^{nd}$ discharge cut-off voltage is [3V, 3.3V). After the electrochemical apparatus undergoes a specified number of cycles based on a low discharge cut-off voltage, the discharge cut-off voltage of the electrochemical apparatus is increased to make silicon discharge slightly. This can reduce mass swelling of silicon and prolong the service life of the electrochemical apparatus. Increase of the discharge cut-off voltage may reduce the capacity of the electrochemical apparatus. The value range of the $3^{rd}$ discharge cut-off voltage is [3.3V, 3.8V), which avoids an excessively reduced capacity of the electrochemical apparatus caused by an excessive increase of the discharge cut-off voltage. The life cycle of the electrochemical apparatus is divided into three cycle segments. At an early stage, a low discharge cut-off voltage is used to fully utilize the high gram capacity advantage of silicon. At a late stage, a high discharge cut-off voltage is used to make silicon discharge slightly to reduce mass swelling of silicon. In this case, the cycle life of the electrochemical apparatus can be prolonged, and the energy density of the electrochemical apparatus can be increased throughout its life cycle.

In a possible implementation, for electrochemical apparatuses in which mass percentages of silicon in the negative electrode active substance are different, cycling slopes are different at different discharge cut-off voltages, and positions of intersections of cycle curves corresponding to different discharge cut-off voltages are different. As shown in FIG. 2, when the mass percentages of silicon in the negative electrode active substance are different, value ranges of b1, b2, V1, V2, and V3 are as follows:

$$\text{If } 0 \leq Si \leq 20\%, 300 \leq b1 \leq 500, 800 \leq b2 \leq 1000, 2.2V \leq V1 < 3V, 3V \leq V2 < 3.3V, 3.3V \leq V3 < 3.8V. \quad (1)$$

$$\text{If } 20\% < Si \leq 60\%, 100 \leq b1 < 300, 600 \leq b2 < 800, 2.2V \leq V1 < 3V, 3V \leq V2 < 3.3V, 3.3V \leq V3 < 3.8V. \quad (2)$$

$$\text{If } 60\% < Si, 1 \leq b1 < 100, 200 \leq b2 < 400, 2.2V \leq V1 < 3V, 3V \leq V2 < 3.3V, 3.3V \leq V3 < 3.8V. \quad (3)$$

In this embodiments of this application, multiple discharge cut-off voltages are properly set based on the mass percentage of silicon in the negative electrode active substance, and the life cycle of the electrochemical apparatus is divided into multiple cycle segments based on the discharge cut-off voltages. At an early stage, a low discharge cut-off voltage is used to fully utilize the high gram capacity advantage of silicon. Then, the discharge cut-off voltage is increased gradually used to make silicon discharge slightly so as to reduce mass swelling of the electrochemical apparatus resulting from silicon swelling. In this case, the cycle life of the silicon system-based electrochemical apparatus is prolonged, and the energy density of the electrochemical apparatus is increased throughout its life cycle.

Electrochemical Apparatus Control Method

Figure 3:
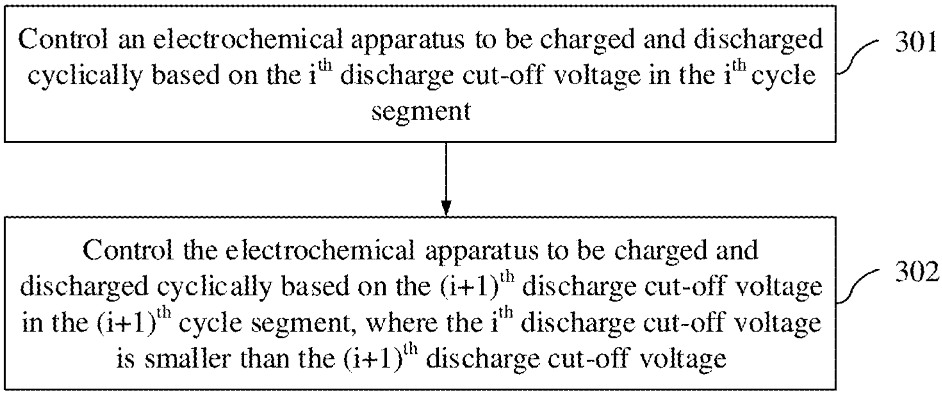
FIG. 3 is a flowchart of an electrochemical apparatus control method according to an embodiment of this application.

FIG. 3 is a flowchart of an electrochemical apparatus control method according to an embodiment of this application. The method is used to control a charging and discharging process of an electrochemical apparatus. A negative electrode active material of the electrochemical apparatus includes a first active material and a second active material, a discharge capacity per unit mass of the first active material is smaller than that of the second active material, and a life cycle of the electrochemical apparatus includes N cycle segments arranged sequentially, where N is a positive integer greater than or equal to 2. Each cycle segment includes at least one charge-discharge cycle of the electrochemical apparatus. As shown in FIG. 3, the electrochemical apparatus control method includes the following steps.

Step 301. Control the electrochemical apparatus to be charged and discharged cyclically based on the $i^{th}$ discharge cut-off voltage in the $i^{th}$ cycle segment.

The life cycle of the electrochemical apparatus includes N cycle segments that are arranged sequentially. The $i^{th}$ cycle segment corresponds to the $i^{th}$ discharge cut-off voltage. The electrochemical apparatus is charged and discharged cyclically based on the $i^{th}$ discharge cut-off voltage in the $i^{th}$ cycle segment.

Step 302. Control the electrochemical apparatus to be charged and discharged cyclically based on the $(i+1)^{th}$ discharge cut-off voltage in the $(i+1)^{th}$ cycle segment, where the $i^{th}$ discharge cut-off voltage is smaller than the $(i+1)^{th}$ discharge cut-off voltage.

From the $1^{st}$ cycle segment to the $(N-1)^{th}$ cycle segment, after the electrochemical apparatus is controlled to be charged and discharged cyclically based on the $i^{th}$ discharge cut-off voltage in the $i^{th}$ cycle segment, the electrochemical apparatus is controlled to be charged and discharged cyclically based on the $(i+1)^{th}$ discharge cut-off voltage in the $(i+1)^{th}$ cycle segment. The $i^{th}$ discharge cut-off voltage is smaller than the $(i+1)^{th}$ discharge cut-off voltage.

In this embodiment of this application, a discharge capacity per unit mass of the second active substance is larger than that of the first active substance, and presence of the second active substance can increase the mass energy density of the electrochemical apparatus. However, a swelling rate of the second active substance is higher than that of the first active substance during the cycling process of the electrochemical apparatus. The life cycle of the electrochemical apparatus is divided into multiple cycle segments, discharging is performed based on a specified discharge cut-off voltage within each cycle segment, and the discharge cut-off voltage is increased gradually according to a time order of the cycle segments. The increase of the discharge cut-off voltage can reduce participation amount of the second active substance during the discharging process. At an early stage of cycling, a low discharge cut-off voltage is used to fully utilize the advantage of the second active substance in discharge capacity per unit mass, so as to increase the mass energy density of the electrochemical apparatus. The discharge cut-off voltage is gradually increased with degradation of cycling, so as to reduce the participation amount of the second active substance during the discharging process. This reduces mass swelling of the electrochemical apparatus resulting from swelling of the second active substance, improves cycling performance of the electrochemical apparatus, and prolongs its service life. As a result, the mass energy density of the electrochemical apparatus is increased while the service life of the electrochemical apparatus is prolonged.

In a possible implementation, the first active substance includes graphite, and the second active substance includes silicon.

In a possible implementation, the life cycle of the electrochemical apparatus includes the $1^{st}$ cycle segment and the $2^{nd}$ cycle segment that are arranged sequentially, and at least one of the following conditions is satisfied: A mass percentage of silicon in the negative electrode active substance is (0%, 20%] and a value range for the number of cycles corresponding to a boundary between the $1^{st}$ cycle segment and the $2^{nd}$ cycle segment is [300, 500]; a mass percentage of silicon in the negative electrode active substance is (20%, 60%], a value range for the number of cycles corresponding to a boundary between the $1^{st}$ cycle segment and the $2^{nd}$ cycle segment is [100, 300); or a mass percentage of silicon in the negative electrode active substance is (60%, 100%] and a value range for the number of cycles corresponding to a boundary between the $1^{st}$ cycle segment and the $2^{nd}$ cycle segment is [1, 100).

In a possible implementation, the life cycle of the electrochemical apparatus includes the $1^{st}$ cycle segment, the $2^{nd}$ cycle segment, and the $3^{rd}$ cycle segment that are arranged sequentially, and at least one of the following conditions is satisfied: A mass percentage of silicon in the negative electrode active substance is (0%, 20%] a value range for the number of cycles corresponding to a boundary between the $1^{st}$ cycle segment and the $2^{nd}$ cycle segment is [300, 500], and a value range for the number of cycles corresponding to a boundary between the $2^{nd}$ cycle segment and the $3^{rd}$ cycle segment is [800, 1000]; a mass percentage of silicon in the negative electrode active substance is (20%, 60%] a value range for the number of cycles corresponding to a boundary between the $1^{st}$ cycle segment and the $2^{nd}$ cycle segment is [100, 300), and a value range for the number of cycles corresponding to a boundary between the $2^{nd}$ cycle segment and the $3^{rd}$ cycle segment is [600, 800); or a mass percentage of silicon in the negative electrode active substance is (60%, 100%] a value range for the number of cycles corresponding to a boundary between the $1^{st}$ cycle segment and the $2^{nd}$ cycle segment is [1, 100), and a value range for the number of cycles corresponding to a boundary between the $2^{nd}$ cycle segment and the $3^{rd}$ cycle segment is [200, 400].

In a possible implementation, in the $i^{th}$ cycle segment between the $1^{st}$ cycle segment and the $(N-1)^{th}$ cycle segment, when the electrochemical apparatus is charged and discharged cyclically based on the number of cycles corresponding to a boundary between the $i^{th}$ cycle segment and the $(i+1)^{th}$ cycle segment, a difference in capacity retention rates, between cyclic charging and discharging based on the $i^{th}$ discharge cut-off voltage and cyclic charging and discharging based on the $(i+1)^{th}$ discharge cut-off voltage, of the electrochemical apparatus is less than 20%.

In a possible implementation, the second active substance includes silicon, and the electrochemical apparatus includes the Pt discharge cut-off voltage and the $2^{nd}$ discharge cut-off voltage. A value range of the Pt discharge cut-off voltage is [2.2V, 3V), and a value range of the $2^{nd}$ discharge cut-off voltage is [3V, 3.3V).

In a possible implementation, the second active substance includes silicon, and the electrochemical apparatus includes the $1^{st}$ discharge cut-off voltage, the $2^{nd}$ discharge cut-off voltage, and the $3^{rd}$ discharge cut-off voltage. A value range of the Pt discharge cut-off voltage is [2.2V, 3V), and a value range of the $2^{nd}$ discharge cut-off voltage is [3V, 3.3V), and a value range of the $3^{rd}$ discharge cut-off voltage is [3.3V, 3.8V).

It should be noted that details of the foregoing electrochemical apparatus control method have been described in the foregoing electrochemical apparatus embodiment of the embodiments of this application. The specific process can be found with reference to the description in the foregoing electrochemical apparatus embodiment, and is not be described herein again.

Electrochemical Apparatus Management System

An embodiment of this application provides an electrochemical apparatus management system. The electrochemical apparatus management system is connected to an electrochemical apparatus and configured to implement the electrochemical apparatus control method in the foregoing embodiment.

It should be noted that the electrochemical apparatus and the electrochemical apparatus control method have been described in detail in the foregoing embodiments. Therefore, a process, in which the electrochemical apparatus management system controls operation of the electrochemical apparatus, may refer to the description in the foregoing embodiments, and is not be described herein again.

Electronic Device

An embodiment of this application provides an electronic device, including the electrochemical apparatus or the electrochemical apparatus management system described in the foregoing embodiments. The electronic device may be a mobile phone, a drone, or the like. A negative electrode active substance of the electrochemical apparatus in the electronic device includes a first active material and a second active material, a discharge capacity per unit mass of the first active material is smaller than that of the second active substance, and a life cycle of the electrochemical apparatus is divided into multiple cycle segments. The discharge cut-off voltage is increased gradually based on the cycle segments. At an early stage of cycling, a low discharge cut-off voltage is used to fully utilize the advantage of the second active substance in discharge capacity per unit mass, so as to increase the mass energy density of the electrochemical apparatus. The discharge cut-off voltage is gradually increased with cycling degradation, so as to reduce the participation amount of the second active substance during the discharging process. This reduces mass swelling of the electrochemical apparatus resulting from swelling of the second active substance, improves cycling performance of the electrochemical apparatus, and prolongs its service life. As a result, the mass energy density of the electrochemical apparatus is increased while the service life of the electrochemical apparatus is prolonged.

Computer-Readable Storage Medium

This application further provides a computer-readable storage medium. The computer-readable storage medium stores a computer program, and when the computer program is executed by a processor, the electrochemical apparatus control method according to any one of the foregoing embodiments is implemented. Specifically, a system or an apparatus equipped with such storage medium may be provided. Software program code that implements functions in any of the foregoing embodiments is stored on the storage medium, and the computer (or CPU or MPU) of the system or apparatus is enabled to read and execute the program code stored in the storage medium.

In this case, the program code read from the storage medium can implement the functions in any one of the foregoing embodiments, so the program code and the storage medium storing the program code constitute a part of this application.

Storage media for providing program code include a floppy disk, a hard disk, a magneto-optical disk, an optical disk (such as CD-ROM, CD-R, CD-RW, DVD-ROM, DVD-RAM, DVD-RW, and DVD+RW), a tape, a non-volatile memory card, and ROM. Optionally, the program code may be downloaded from a server computer through a communication network.

Furthermore, it should be clear that part or all of actual operations can be completed not only by executing the program code read from a computer but also by using instructions based on the program code to instruct an operating system on the computer, thereby implementing functions in any of the foregoing embodiments.

Furthermore, it can be understood that the program code read from the storage medium is written into a memory disposed on an expansion board that is inserted into the computer or written into a memory disposed on an expansion module connected to the computer. Then, a CPU installed on the expansion board or the expansion module executes part and all actual operations based on instructions of the program code, so that functions in any one of the foregoing embodiments are implemented.

Computer Program Product

This application further provides a computer program product. The computer program product is stored on a computer-readable medium and includes computer-executable instructions. When the computer-executable instructions are executed, the electrochemical apparatus control method according to any one of the foregoing embodiments is implemented by at least one processor. It should be understood that solutions in this embodiment have corresponding technical effects as in the foregoing method embodiments, and are not described herein again.

EXAMPLES AND COMPARATIVE EXAMPLES

The following describes in detail some examples and comparative examples in the embodiments of this application by using a lithium-ion battery as an example of the electrochemical apparatus. These examples and comparative examples help find the significant advantages of the electrochemical apparatus and the control method therefor, the electronic device and the storage medium according to the embodiments of this application over the prior art. It should be understood that the following examples and comparative examples are only used to better explain rather than limit the embodiments of this application.

Comparative Example

Parameter of lithium-ion battery: The mass percentage of silicon in the negative electrode active substance is 5%.

Experiment procedure: At 25° C., cyclic charging and discharging was performed based on a discharge cut-off voltage of 3.0V, 3.2V, 3.3V, and 3.4V, and capacity of the lithium-ion battery was tested in each cycle.

EXAMPLE

Parameter of the lithium-ion battery: Same as that in the comparative example, that is, the mass percentage of silicon in the negative electrode active substance is 5%.

Experiment procedure: At 25° C., cyclic charging and discharging was performed based on a discharge cut-off voltage of 3.0V for the first 200 cycles, cyclic charging and discharging was performed based on a discharge cut-off voltage of 3.2V from cycles 201 to 600, and cyclic charging and discharging was performed based on a discharge cut-off voltage of 3.4V from cycle 601. The capacity of the lithium-ion battery was tested in each cycle to learn the change of the capacity retention rate of the lithium-ion battery along with the number of cycles.

FIG. 1 shows curves of capacity of the lithium-ion battery varying with the number of cycles in the comparative example. A curve 101 corresponds to a discharge cut-off voltage of 3.0V, a curve 102 corresponds to a discharge cut-off voltage of 3.2V, a curve 103 corresponds to a discharge cut-off voltage of 3.3V, and a curve 104 corresponds to a discharge cut-off voltage of 3.4V. It can be seen from FIG. 1 that when the discharge cut-off voltage is higher, cycling stability of the electrochemical apparatus is better, but initial capacity may decrease accordingly. The cycling curves corresponding to different discharge cut-off voltages have intersections at which a specified number of cycles is reached.

FIG. 2 shows curves of capacity of the lithium-ion battery varying with the number of cycles in the comparative example. A curve 201 corresponds to a discharge cut-off voltage of 3.0V, a curve 202 corresponds to a discharge cut-off voltage of 3.2V, and a curve 203 corresponds to a discharge cut-off voltage of 3.4V. An intersection 1 was observed where the cycle curve 201 corresponding to the discharge cut-off voltage of 3V intersected the cycle curve 202 corresponding to the discharge cut-off voltage of 3.2V upon 200 cycles (b1), and an intersection 2 was observed where the cycle curve 202 corresponding to the discharge cut-off voltage of 3.2V intersected the cycle curve 230 corresponding to the discharge cut-off voltage of 3.4V upon 600 cycles (b2). After 200 cycles, the cycling capacity is larger and the cycling stability is higher when the discharge cut-off voltage is 3.2V, as compared with the discharge cut-off voltage of 3V. The conclusion is the same after 600 cycles.

It can be learned from FIG. 2 that for an electrochemical apparatus in which the mass percentage of silicon in the negative electrode active substance is 5%, if the discharge cut-off voltage is adjusted at cycle 200 and cycle 600, the entire cycling process can be more stable. This can increase the mass energy density of the electrochemical apparatus and guarantee longer service life of the electrochemical apparatus.

It should be noted that although a quantity of modules or units of the device for action execution are mentioned in the foregoing detailed description, such division is not mandatory. Actually, according to the embodiments of this application, features and functions of two or more modules or units described above can be embodied in one module or unit. Conversely, the features and functions of a module or unit described above can be embodied by a plurality of modules or units obtained by division.

In addition, although the steps of the method provided by this application are described in a particular order in the drawings, it is not required or implied that the steps must be performed in such particular order, or that all these steps must be performed to achieve the desired results. Additionally or alternatively, some steps may be omitted, multiple steps may be combined into one step for execution, and/or one step may be broken down into multiple steps for execution.

According to the description of the foregoing embodiments, those skilled in the art can easily understand that the example embodiments described herein may be implemented by software, or may be implemented by software in combination with necessary hardware. Therefore, the technical solutions according to the embodiments of this application may be in the form of a software product. The software product may be stored in a non-volatile storage medium (which may be a CD-ROM, a USB flash drive, a removable hard disk, or the like) or on a network. A quantity of instructions are included so that a computing device (which may be a personal computer, a server, a mobile terminal, a network device, or the like) can implement the method according to the embodiment of the present disclosure.

After considering the specification and implementing the invention disclosed herein, those of skilled in the art can easily consider other embodiments of this application. This application is intended to cover any modifications, uses, or adaptations of the present disclosure. Such modifications, uses or adaptations follow the general principles of the present disclosure, and include common knowledge or conventional technical means in the technical field which are not disclosed in the present disclosure. The specification and examples are considered exemplary only, with a true scope and spirit of this application indicated by the appended claims.

What is claimed is:

1. An electrochemical apparatus, comprising: a negative electrode active substance; wherein the negative electrode active substance comprises a first active substance and a second active substance, a discharge capacity per unit mass of the first active substance is smaller than that of the second active substance; a life cycle of the electrochemical apparatus comprises N cycle segments arranged sequentially, wherein N is a positive integer greater than or equal to 2, each cycle segment comprises at least one charge-discharge cycle of the electrochemical apparatus, and the electrochemical apparatus is charged and discharged cyclically based on an $i^{th}$ discharge cut-off voltage in an $i^{th}$ cycle segment, wherein $1 \leq i \leq N$; and the $i^{th}$ discharge cut-off voltage between a $1^{st}$ discharge cut-off voltage and an $(N-1)^{th}$ discharge cut-off voltage is smaller than an $(i+1)^{th}$ discharge cut-off voltage.

2. The electrochemical apparatus according to claim 1, wherein the first active substance comprises graphite, and the second active substance comprises silicon.

3. The electrochemical apparatus according to claim 2, wherein the life cycle of the electrochemical apparatus comprises a $1^{st}$ cycle segment and a $2^{nd}$ cycle segment arranged sequentially, and one of the following conditions is satisfied:

a mass percentage of the silicon in the negative electrode active substance is (0%, 20%], and a value range for a number of cycles corresponding to a boundary between the $1^{st}$ cycle segment and the $2^{nd}$ cycle segment is [300, 500];

a mass percentage of silicon in the negative electrode active substance is (20%, 60%], and a value range for the number of cycles corresponding to a boundary between the $1^{st}$ cycle segment and the $2^{nd}$ cycle segment is [100, 300); or a mass percentage of silicon in the negative electrode active substance is (60%, 100%), and a value range for the number of cycles corresponding to a boundary between the $1^{st}$ cycle segment and the $2^{nd}$ cycle segment is [1, 100).

4. The electrochemical apparatus according to claim 2, wherein the life cycle of the electrochemical apparatus comprises a $1^{st}$ cycle segment, a $2^{nd}$ cycle segment, and a $3^{rd}$ cycle segment arranged sequentially, and one of the following conditions is satisfied:

a mass percentage of silicon in the negative electrode active substance is (0%, 20%], a value range for a number of cycles corresponding to a boundary between the $1^{st}$ cycle segment and the $2^{nd}$ cycle segment is [300, 500], and a value range for the number of cycles corresponding to a boundary between the $2^{nd}$ cycle segment and the $3^{rd}$ cycle segment is [800, 1000];

a mass percentage of silicon in the negative electrode active substance is (20%, 60%], a value range for the number of cycles corresponding to a boundary between the $1^{st}$ cycle segment and the $2^{nd}$ cycle segment is [100, 300), and a value range for the number of cycles corresponding to a boundary between the $2^{nd}$ cycle segment and the $3^{rd}$ cycle segment is [600, 800); or a mass percentage of silicon in the negative electrode active substance is (60%, 100%], a value range for the number of cycles corresponding to a boundary between the $1^{st}$ cycle segment and the $2^{nd}$ cycle segment is [1, 100), and a value range for the number of cycles corresponding to a boundary between the $2^{nd}$ cycle segment and the $3^{rd}$ cycle segment is [200, 400].

5. The electrochemical apparatus according to claim 1, wherein in the $i^{th}$ cycle segment between a $1^{st}$ cycle segment and a $(N-1)^{th}$ cycle segment, when the electrochemical apparatus is charged and discharged cyclically based on a number of cycles corresponding to a boundary between the $i^{th}$ cycle segment and a $(i+1)^{th}$ cycle segment, a difference in capacity retention rates, between cyclic charging and discharging based on the $i^{th}$ discharge cut-off voltage and cyclic charging and discharging based on the $(i+1)^{th}$ discharge cut-off voltage, of the electrochemical apparatus is less than 20%.

6. The electrochemical apparatus according to claim 1, wherein the second active substance comprises silicon, and the electrochemical apparatus comprises a $1^{st}$ discharge cut-off voltage and a $2^{nd}$ discharge cut-off voltage; wherein a value range of the $1^{st}$ discharge cut-off voltage is [2.2V, 3V), and a value range of the $2^{nd}$ discharge cut-off voltage is [3V, 3.3V).

7. The electrochemical apparatus according to claim 1, wherein the second active substance comprises silicon, and the electrochemical apparatus comprises a $1^{st}$ discharge cut-off voltage, a $2^{nd}$ discharge cut-off voltage, and a $3^{rd}$ discharge cut-off voltage; wherein a value range of the $1^{st}$ discharge cut-off voltage is [2.2V, 3V), a value range of the $2^{nd}$ discharge cut-off voltage is [3V, 3.3V), and a value range of the $3^{rd}$ discharge cut-off voltage is [3.3V, 3.8V).

8. The electrochemical apparatus according to claim 1, wherein the second active substance comprises silicon; and wherein the electrochemical apparatus is configured with multiple discharge cut-off voltages corresponding to a mass percentage of silicon in the negative electrode active substance.

9. A method to control a charging and discharging process of an electrochemical apparatus, wherein a negative electrode active substance of the electrochemical apparatus comprises a first active substance and a second active substance, a discharge capacity per unit mass of the first active substance is smaller than that of the second active substance, and a life cycle of the electrochemical apparatus comprises N cycle segments arranged sequentially, wherein N is a positive integer greater than or equal to 2, and each cycle segment comprises at least one charge-discharge cycle of the electrochemical apparatus; wherein the method comprises:

controlling the electrochemical apparatus to be charged and discharged cyclically based on an $i^{th}$ discharge cut-off voltage in an $i^{th}$ cycle segment, wherein the $i^{th}$ discharge cut-off voltage between a $1^{st}$ discharge cut-off voltage and an $(N-1)^{th}$ discharge cut-off voltage is smaller than the $(i+1)^{th}$ discharge cut-off voltage.

10. A computer-readable storage medium, wherein the computer-readable storage medium stores a computer program, and when the computer program is executed by a processor, the electrochemical apparatus control method according to claim 9 is implemented.

11. An electronic device, comprising an electrochemical apparatus, comprising: a negative electrode active substance, wherein the negative electrode active substance comprises a first active substance and a second active substance, a discharge capacity per unit mass of the first active substance is smaller than that of the second active substance, and a life cycle of the electrochemical apparatus comprises N cycle segments arranged sequentially, wherein N is a positive integer greater than or equal to 2, each cycle segment comprises at least one charge-discharge cycle of the electrochemical apparatus, and the electrochemical apparatus is charged and discharged cyclically based on an $i^{th}$ discharge cut-off voltage in an $i^{th}$ cycle segment, wherein $1 \leq i \leq N$, and;

the $i^{th}$ discharge cut-off voltage between a $1^{st}$ discharge cut-off voltage and an $(N-1)^{th}$ discharge cut-off voltage is smaller than an $(i+1)^{th}$ discharge cut-off voltage.

12. The electronic device according to claim 11, wherein the first active substance comprises graphite, and the second active substance comprises silicon.

13. The electronic device according to claim 11, wherein the life cycle of the electrochemical apparatus comprises a $1^{st}$ cycle segment and a $2^{nd}$ cycle segment arranged sequentially, and one of the following conditions is satisfied:

a mass percentage of silicon in the negative electrode active substance is (0%, 20%], and a value range for a number of cycles corresponding to a boundary between the $1^{st}$ cycle segment and the $2^{nd}$ cycle segment is [300, 500];

a mass percentage of silicon in the negative electrode active substance is (20%, 60%], and a value range for the number of cycles corresponding to a boundary between the $1^{st}$ cycle segment and the $2^{nd}$ cycle segment is [100, 300); or a mass percentage of silicon in the negative electrode active substance is (60%, 100%), and a value range for the number of cycles corresponding to a boundary between the $1^{st}$ cycle segment and the $2^{nd}$ cycle segment is [1, 100).

14. The electronic device according to claim 11, wherein the life cycle of the electrochemical apparatus comprises a $1^{st}$ cycle segment, a $2^{nd}$ cycle segment, and a $3^{rd}$ cycle segment arranged sequentially, and one of the following conditions is satisfied:

a mass percentage of silicon in the negative electrode active substance is (0%, 20%], a value range for a number of cycles corresponding to a boundary between the $1^{st}$ cycle segment and the $2^{nd}$ cycle segment is [300, 500], and a value range for the number of cycles corresponding to a boundary between the $2^{nd}$ cycle segment and the $3^{rd}$ cycle segment is [800, 1000];

a mass percentage of silicon in the negative electrode active substance is (20%, 60%], a value range for the number of cycles corresponding to a boundary between a $1^{st}$ cycle segment and a $2^{nd}$ cycle segment is [100, 300), and a value range for the number of cycles corresponding to a boundary between a $2^{nd}$ cycle segment and a $3^{rd}$ cycle segment is [600, 800); or a mass percentage of silicon in the negative electrode active substance is (60%, 100%], a value range for the number of cycles corresponding to a boundary between a $1^{st}$ cycle segment and a $2^{nd}$ cycle segment is [1, 100), and a value range for the number of cycles corresponding to a boundary between a $2^{nd}$ cycle segment and a $3^{rd}$ cycle segment is [200, 400].

15. The electronic device according to claim 11, wherein in the $i^{th}$ cycle segment between a $1^{st}$ cycle segment and a $(N-1)^{th}$ cycle segment, when the electrochemical apparatus is charged and discharged cyclically based on a number of cycles corresponding to a boundary between the $i^{th}$ cycle segment and an $(i+1)^{th}$ cycle segment, a difference in capacity retention rates, between cyclic charging and discharging based on the $i^{th}$ discharge cut-off voltage and cyclic charging and discharging based on the $(i+1)^{th}$ discharge cut-off voltage, of the electrochemical apparatus is less than 20%.

16. The electronic device according to claim 11, wherein the second active substance comprises silicon, and the electrochemical apparatus comprises the $1^{st}$ discharge cut-off voltage and a $2^{nd}$ discharge cut-off voltage; wherein a value range of the $1^{st}$ discharge cut-off voltage is [2.2V, 3V), and a value range of the $2^{nd}$ discharge cut-off voltage is [3V, 3.3V).

17. The electronic device according to claim 11, wherein the second active substance comprises silicon, and the electrochemical apparatus comprises a $1^{st}$ discharge cut-off voltage, a $2^{nd}$ discharge cut-off voltage, and a $3^{rd}$ discharge cut-off voltage; wherein a value range of the $1^{st}$ discharge cut-off voltage is [2.2V, 3V), a value range of a $2^{nd}$ discharge cut-off voltage is [3V, 3.3V), and a value range of a $3^{rd}$ discharge cut-off voltage is [3.3V, 3.8V).

* * * * *